A. WISSLER.
Jack for Horse-Powers.
No. 221,204.   Patented Nov. 4, 1879.
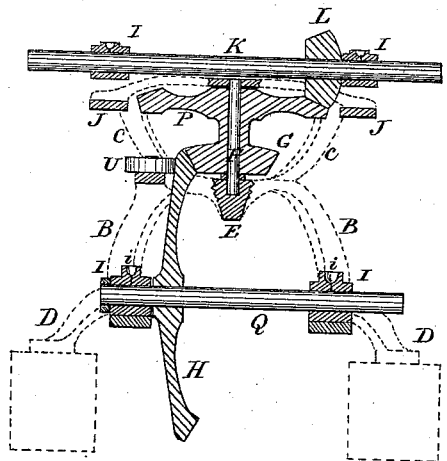
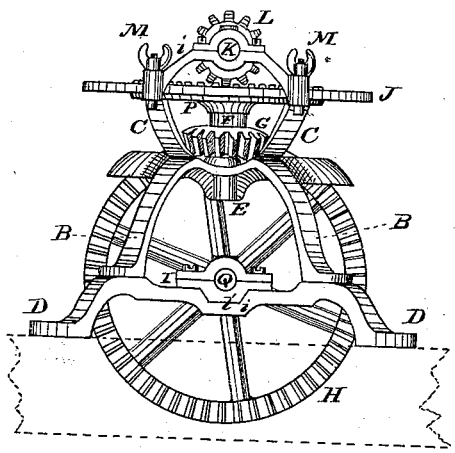
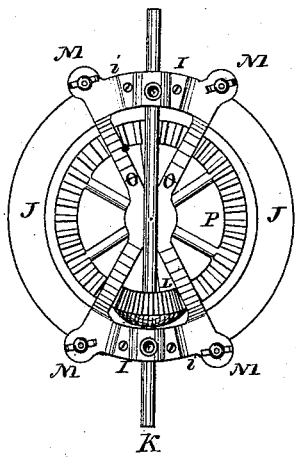
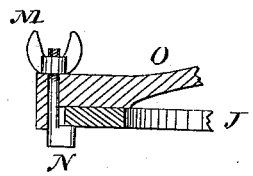
WITNESSES
W. B. Whley
Jacob Stauffer
INVENTOR
Aaron Wissler

UNITED STATES PATENT OFFICE

AARON WISSLER, OF BRUNERSVILLE, PENNSYLVANIA.

IMPROVEMENT IN JACKS FOR HORSE-POWERS.

Specification forming part of Letters Patent No. 221,204, dated November 4, 1879; application filed April 28, 1879.

*To all whom it may concern:*

Be it known that I, AARON WISSLER, of Brunersville, in the county of Lancaster and State of Pennsylvania, have invented certain Improvements in a Jack for Transmitting Horse-Power, of which the following is a specification.

The improvements consist in making substantial changes in the mode of shifting and supporting the gear of a certain jack or horse-power for which a patent was given, dated December 12, 1871, No. 121,740, to me, the said Wissler, and Jacob Gamber, now vested to my own use by virtue of assignment. These alterations, while they tend to lessen the difficulty and expense in casting, greatly increase the strength of the machine, and it is more compact and much easier fitted up, so as to make a much better, more satisfactory, and cheaper jack for transmitting power in any direction without change of base.

The accompanying drawings, with the letters of reference marked thereon, and a brief explanation will enable those skilled in the art to make and use the same, in which—

Figure 1 is a front elevation, Fig. 2 an end elevation, and Fig. 3 a top view, of the plain ring or guide-circle and crown-wheel, &c. Fig. 4 shows one of the combined ends of the cross-piece or spider O, with its socket, (turn-bolt N and binding-nut M,) which sets against the periphery of the ring, as well as upon its upper surface, doing away with the concentric slot in the ring with its flanges, so hard to cast and fit up, and the slots in the ends of the spider, so liable to become loose on its bolts—elements in the former claims now not used.

The improvement in the supports for the gearing consists of three distinct castings. The lower section, D, has perforated feet, by which it can be bolted upon sills or a solid floor. Two of its joining sides are parallel to each other, and carry the journal-bearings I *i* of a horizontal shaft, Q, with its vertical bevel driving-wheel H extending above to the second section, B, which is bolted upon the base-section D at four points or supports, united above, giving a direct bearing for an anti-friction roller, U, to bear against the outer side of the rim of the wheel H opposite its contact with a bevel-pinion, G, combined on a hollow hub with the horizontal crown-wheel P, which jointly revolve on a vertical shaft or pivot, F, affixed to the united center of section B at E. Section C has four supports bolted upon section B, having a terminal plain flat ring, J, with a smooth upper surface and square or right-angled edge, against which edge the shoulders on the socket ends of the spider O set as guides in shifting. Fig. 3 shows this X-shaped spider, the two ends on opposite sides united by the pillow-blocks *i* of the journal-bearings I of a shaft, K, carrying a pinion, L, that gears into the cogs of the crown-wheel P at all points of its circumference, as in the former patent, only the adjustment is now made by means of a bolt having a projecting head, N, on one side, to turn inward under the ring J, and secured by a binding-nut or thumb-screw, M, on the four several sockets and shouldered ends of the spider O.

This simple arrangement, with its plain ring J, is a decided improvement in making it not only better and more firm, but much cheaper and more durable, giving all the advantage for reversing or shifting the direction without shifting the machine, thus preserving all its good qualities, greatly improved in strength and cheapness.

I do not show the fly-wheel or universal connecting-joint or strap-pulley for transferring the motion of horse, steam, or other power to this jack, as such are no part of my improvement.

I am aware, also, that the general arrangement of the gearing remains the same; but the anti-friction roller, the spider, and ring combination differ substantially, as do the supports, and their adaptation to make a more compact and portable machine as a whole, in all points superior and more satisfactory, which elements are not secured by the former claims. As now constructed it makes a new or improved jack for the transmission of horse or other power.

What I desire to secure in this improvement is—

1. In combination with a horizontal plain ring or guideway, J, the cross-piece or spider O, its opposite ends united by elevated pillow-blocks *i*, with shouldered sockets, setting against the outer edge of said ring, and made adjustable at any point of the circle by means of bolts N, having a one-sided head, held in the sockets by binding screw-nuts M, substantially as and for the purpose specified.

2. In combination with aforesaid spider O and pillow-blocks $i$ or journal-bearings I, the shaft K, pinion L, crown-wheel P, which is united by a sleeve with pinion G, jointly set over a fixed shaft, F, when said shaft sets centrally at the point of union of the four supports B, and said supports joined above to form the direct seat for the anti-friction stay-roller U, bearing against the upper outer rim of the vertical driving-wheel H, the whole constructed and operating as and for the purpose set forth.

AARON WISSLER.

Witnesses:
W. B. WILEY,
JACOB STAUFFER.